United States Patent Office 3,644,428
Patented Feb. 22, 1972

3,644,428
PRINS-TYPE REACTIONS
Hugh Stewart Inglis, Stockton-on-Tees, England, assignor to Imperial Chemical Industries Limited, London, England
No Drawing. Filed July 22, 1969, Ser. No. 843,827
Claims priority, application Great Britain, Aug. 29, 1968, 41,358/68
Int. Cl. C07d 7/08, 15/02
U.S. Cl. 260—345.1           16 Claims

ABSTRACT OF THE DISCLOSURE

A process for reacting a conjugated diolefin, e.g. 1,3-butadiene, with formaldehyde to give a product comprising a major proportion of a dihydropyran, e.g. 5,6-dihydro-2H-pyran in which the reaction takes place in the presence of a Lewis acid catalyst and a substantially non-aqueous solvent.

---

This invention relates to Prins-type reactions between conjugated diolefins particularly 1,3-butadiene, and formaldehyde.

The reaction of 1,3-butadiene with formaldehyde, in the presence of protonic acid catalysts such as sulphuric acid, yields a mixture of three principal products namely; 4-vinyl-1,3-dioxane I; 5,6-dihydro-2H-pyran II; and trioxa-1,3,7-perhydronaphthalene III.

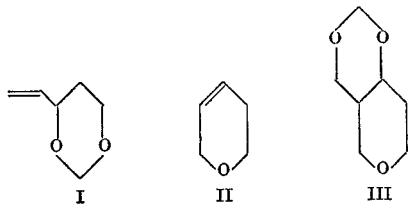

The order of abundance of these three products in the mixture produced is I>III>II, the mixture generally containing a major proportion of I. Small increases in the proportion of II in the mixture produced can be achieved by performing the reaction at higher temperatures, higher butadiene/formaldehyde ratios and longer reaction times. Such conditions however result in the formation of increasing amounts of oxygenated polymer and also accelerate the formation of butadiene polymers such as 4-vinyl cyclohexene and cyclooctadienes.

According to the present invention we provide a process for reacting a conjugated diolefin with formaldehyde to give a product comprising a major proportion of dihydropyran wherein the conjugated diolefin and formaldehyde are contacted in the presence of a Lewis acid catalyst and a substantially non-aqueous solvent.

It should be understood that throughout this specification the term conjugated diolefin includes substituted conjugated diolefins such as, for example, chloroprene, isoprene and dimethyl butadiene. Preferably the conjugated diolefin is 1,3-butadiene, in which case the main component of the reaction product is 5,6-dihydro-2H-pyran II.

In substantially non-aqueous systems Lewis acids catalyse the reaction between conjugated diolefins and formaldehyde with high selectivity towards dihydro pyrans such as II. However in the presence of more than trace amounts of water hydrolysis will generally occur to give protonic acids which then catalyse the reaction in the normal way to give a reaction product in which the dihydropyran is only a minor constituent. Under experimental conditions trace amounts of water will almost always be present in the reaction mixture. Such small amounts of water are however insufficient to alter the course of the reaction.

Suitable non-aqueous solvents are straight chain ethers, preferably di-alkyl ethers e.g. diethyl ether and aliphatic or aromatic nitriles such as benzonitrile and propionitrile.

The activity of the Lewis acid catalyst follows the known sequence of acidity of the Lewis acids, i.e.

$$ZnCl_2 AlCl_3 BF_3$$

in ascending order of activity. The preferred catalysts are aluminium chloride and boron trifluoride, the latter being preferably added as a boron trifluoride diethyl etherate complex. Other catalysts which may be used include stannic chloride, antimony pentachloride, boron tribromide aluminium bromide, and zinc chloride. The catalysts are preferably added to the reaction mixture in amounts between 2.0 gms. and 20.0 gms. per 100 mls. of solution.

The temperature at which the reaction is carried out may be varied over a wide range e.g. 20° C. to 150° C. Preferably the reaction is carried out at 80° C. to 100° C. in an autoclave, the formaldehyde being added in the form of paraformaldehyde or trioxane. The conjugated diolefin and formaldehyde are suitably added to the reaction mixture in molar proportions between 3:1 and 1:3, preferably about equimolar proportions. Suitably the conjugated diolefine and formaldehyde are each added to the reaction mixture in amounts between 0.1 mole and 1 mole per 100 mls. of solvent, preferably between 0.2 mole and 0.6 mole per 100 mls. of solvent.

The dihydropyran produced during the reaction tends to form complexes with the catalyst, thus inhibiting the reaction to some extent. We have found however that, after the reaction, the dihydropyran may be distilled off and the residual catalyst solution reused without the activity or selectivity of the catalyst being significantly impaired.

The invention is illustrated by the following examples:

EXAMPLE 1

12 gms. (0.4 mole) paraformaldehyde, 80 mls. diethyl ether and 10 gms. aluminium chloride were placed in a 300 mls. glass-lined autoclave with 34 mls. (0.4 mole) 1,3-butadiene. The reaction mixture was then heated at 90° C.–100° C. with rapid stirring for 1 hour. The product obtained at the end of this period was a clear light brown liquid which upon analysis was found to contain 2.1 gms. (0.025 mole) 5,6-dihydro-2H-pyran II and 0.5 gms. (0.004 mole) 4-vinyl-1,3 dioxane I, tri-1,3,7-oxaperhydronaphthalene III being present in trace amounts only. The yield of I based upon butadiene reacted was 14% and the yield of II was 86%.

EXAMPLE 2

12 gms. paraformaldehyde, 80 mls. diethyl ether and 8 mls. boron trifluoride diethyl etherate complex (density= 1.13 gms./ml.) were placed in a 300 mls. glass-lined autoclave with 34 mls. 1,3-butadiene. The reaction mixture was then heated for 1 hour at 80° C.–88° C. with rapid stirring (stirrer rate 1250 r.p.m.). The product obtained at the end of this period was a clear light brown liquid which upon analysis was found to contain 1.6 gms. (0.020 mole) 5,6-dihydro-2H-pyran II and 1.0 gm. (0.009 mole) 4-vinyl-1,3-dioxane I, trioxa-1,3,7-perhydronaphthalene III being present in trace amounts only. The yield of I based upon butadiene reacted was 31% and the yield of II was 69%.

EXAMPLE 3

12 gms. paraformaldehyde, 80 mls. diethyl ether, 8 mls. boron trifluoride diethyl etherate complex, 34 mls. 1,3-butadiene and 10 mls. water were added to a 300 mls.

glass-lined autoclave. The reaction mixture was then heated at 80° C.–90° C. for 1 hour. Upon analysis the product was found to contain 11.1 gms. (0.096 mole) 4-vinyl-1,3-dioxane I and 2.9 gms. (0.036 mole) 5,6-dihydro-2H-pyran II, trioxan-1,3,7-perhydronaphthalene III being present in trace amounts only. The yield of I based upon butadiene reacted was 72.6% and the yield of II 27.4%. Thus in the presence of water, marked changes in the selectivity and activity of the catalysts was found. Further increases in the volume of water added to the reaction mixture increased the ratio of I to II in the product.

EXAMPLE 4

24 gms. (0.8 mole) paraformaldehyde, 68 mls. (0.8 mole) 1,3-butadiene, 150 mls. benzonitrile and 15 gms. aluminium trichloride were placed in a 1000 mls. glass-lined autoclave and heated at 85° C. for 1 hour. After reaction, the product solution was analysed and found to contain 1.01 gms. (0.012 mole) 5,6-dihydro-2H-pyran II and 0.11 gm. (0.001 mole) 4-vinyl meta-dioxane I. Trioxa-1,3,7-perhydronaphthalene III was absent. The selectivity of the reaction towards II was 93% and towards I, 7%.

EXAMPLE 5

6 gms. (0.2 mole) paraformaldehyde, 17 mls. (0.2 mole) 1,3-butadiene, 80 mls. diethyl ether and 10 gms. aluminium chloride were heated in a glass-lined autoclave for 1 hour at 80° C. After reaction, the product solution was analysed and found to contain 1.68 gms. (0.02 mole) 5,6-dihydro-2H-pyran II and 0.3 gm. (0.003 mole) 4-vinyl-meta dioxane I. The selectivity of the reaction towards II was 86% and towards I, 14%. The reaction mixture was distilled to remove solvent and compounds I and II. When 60 ml. of solvent and product had been removed, the residual catalyst solution was returned to the autoclave and fresh solvent and reactants added in the same quantities as before. After heating the mixture for 1 hour at 80° the resulting solution was found to contain 1.09 gms. (0.013 mole) dihydropyran II and 0.3 gm. (0.003 mole) dioxane I. The selectivity of the further reaction towards II was 82% and towards I, 18%.

EXAMPLE 6

12 gms. (0.4 mole) trioxane, 34 mls. (0.4 mole) 1,3-butadiene, 80 ml. diethyl ether and 10 gms. aluminium tribromide were heated at 140° C. in a 1000 ml. glass-lined autoclave for one hour. After reaction, the resulting solution was analysed and found to contain 1.94 gms. (0.023 mole) 5,6-dihydro-2H-pyran II. Only trace amounts of 4-vinyl-meta dioxane I and trioxa-1,3,7-perhydronaphthalene could be detected. The selectivity of the reaction towards II was >98%.

EXAMPLE 7

12 gms. (0.4 mole) trioxane, 34 mls. (0.4 mole) 1,3-butadiene, 8 mls. anhydrous stannic chloride and 80 mls. diethyl ether were heated for one hour in a 1000 ml. glass-lined autoclave at 85° C. After reaction, the resulting solution was found to contain 0.67 gm. (0.008 mole) of 5,6-dihydro-2H-pyran II. All other products were present in trace amounts only. The selectivity of the reaction towards II was >98%.

I claim:
1. A process for reacting a conjugated diolefin selected from the group consisting of butadiene and isoprene with formaldehyde to give a product consisting predominantly of a dihydropyran wherein the conjugated diolefin and formaldehyde are contacted in the presence of a Lewis acid catalyst and a solvent, water being substantially absent.
2. A process according to claim 1 wherein the conjugated diolefin is 1,3-butadiene and the product comprises a major proportion of 5,6-dihydro-2H-pyran.
3. A process according to claim 1 wherein the solvent is a straight chain ether.
4. A process according to claim 3 wherein the straight chain ether is diethyl ether.
5. A process according to claim 1 wherein the solvent is a nitrile.
6. A process according to claim 5 wherein the nitrile is selected from the group comprising propionitrile and benzonitrile.
7. A process according to claim 1 wherein the Lewis acid catalyst is selected from the group consisting essentially of aluminium chloride and boron trifluoride.
8. A process according to claim 1 wherein the Lewis acid catalyst is selected from the group consisting essentially of stannic chloride, antimony pentachloride, boron tribromide, aluminium bromide and zinc chloride.
9. A process according to claim 1 wherein the catalyst is added to the reaction mixture in an amount between 2.0 gms. and 20.0 gms per 100 mls. of solution.
10. A process according to claim 1 whenever carried out at a temperature between 20° C. and 150° C.
11. A process according to claim 10 whenever carried out at a temperature between 80° C. and 100° C.
12. A process according to claim 1 wherein formaldehyde is added to the reaction mixture in a form selected from the group consisting essentially of paraformaldehyde and trioxane.
13. A process according to claim 1 wherein the conjugated diolefin and formaldehyde are added to the reaction mixture in molar proportions between 3:1 and 1:3.
14. A process according to claim 13 wherein the conjugated diolefin and formaldehyde are added to the reaction mixture in substantially equimolar proportions.
15. A process according to claim 1 wherein the conjugated diolefin and formaldehyde are each added to the reaction mixture in amounts between 0.1 mole and 1 mole per 100 mls. of solvent.
16. A process according to claim 1 wherein, after the reaction, the product is removed by distillation and the residual catalyst reused.

References Cited

UNITED STATES PATENTS 3,414,588  12/1968  Jones _____ 260—345.1 X
3,576,011   4/1971  Haynes _____ 260—345.1

OTHER REFERENCES

Arundale et al.: Chemical Reviews, vol. 51, pp. 505, 533, and 547–50 (1952).

JOHN M. FORD, Primary Examiner

U.S. Cl. XR.

260—340.7